INVENTOR

WILLIAM W. BUCHANAN

BY Cushman, Darby & Cushman

ATTORNEYS

INVENTOR
WILLIAM W. BUCHANAN
BY Cushman, Darby & Cushman
ATTORNEYS

Oct. 11, 1966 W. W. BUCHANAN 3,277,778

MICROFILM IMAGE RETRIEVAL SYSTEM

Filed March 12, 1964

4 Sheets-Sheet 3

INVENTOR
WILLIAM W. BUCHANAN

BY Cushman, Darby & Cushman
ATTORNEYS

INVENTOR
WILLIAM W. BUCHANAN

BY Cushman, Darby & Cushman
ATTORNEYS 3,277,778
MICROFILM IMAGE RETRIEVAL SYSTEM
William W. Buchanan, 7704 Sebago Road, Bethesda, Md.
Filed Mar. 12, 1964, Ser. No. 351,441
13 Claims. (Cl. 88—24)

This invention relates to the general field of information storage and retrieval systems, and more particularly to those systems employing reels of microfilm as storage media.

The invention includes a reel microfilm image retrieval function and also a coordinate reference search function on preprinted number sheets, graph paper, maps, or "peek-a-boo" term card systems. The invention itself provides a means of combining these functions simultaneously through the means of linking (either mechanically or electrically) the film drive mechanism to the action of aligning cross hairs on movable $x$ and $y$ coordinate scales at a significant, unique position-address on one of several types of coordinate search sheets. This position-address shall have been determined either through a coordinate search on single sheets, or as the visible read-out from multiple or single numbers of "peek-a-boo" cards superimposed over a light source.

Prior art accomplishes frame selection on reels of microfilm as a separate function; either by visual scanning, linear measurement, photocell frame counters, or binary coding. In each case, an operator is required to conduct the search either by manually activating the film drive mechanism or by keyboard input. Usually, this requires a prior reference search which will provide a digital or otherwise indexed "address" for the input.

Therefore, the principal objects of the invention are to provide:

(1) A system in which the action of a coordinate reference search simultaneously and automatically accomplishes a document search on reel microfilm.

(2) A system of the type which has a large storage capacity and retrieval capability.

(3) A system which affords direct access to a microfilm frame.

(4) A system which eliminates the need for digital read-out of coordinate search sheets or "peek-a-boo" cards.

(5) A system which eliminates the need for digital input to the film reel search mechanism.

(6) A system which results in much greater speed and accuracy than are obtainable in related manual systems.

(7) A system which results in great savings in cost over more sophisticated machine systems.

(8) A system in which electrical servo systems may be utilized instead of manually reeling the cable drive; and (9) A system in which photocell scanners may be used to indicate the lighted hole positions in the "peek-a-boo" cards.

(10) A system in which the action of a coordinate reference search simultaneously accomplishes a linear information search on reels of paper tape or magnetic tape and any other information or image storage medium in which the collection is stored for retrieval by linear search (so that the coordinate position address corresponds to the linear position address).

As an illustrative example of how this device might be applied in its simplest form, its use in circulation control system in libraries is described in detail but limitation to such use is not intended.

In one of the most efficient circulation control systems in public libraries, the book card, borrower's card, transaction number, due date, and other optional data, are photographed together onto a single exposure of microfilm. For reasons of economy it is desirable that only those transactions which prove to be overdue (about 5% of those that have been filmed) are ever printed on hard copy. Thus, it is necessary to cancel all the completed transactions as the books are returned so that by the due (usually a weekday during the fourth week from the charge date) the uncancelled numbers will represent all of the incomplete transactions, i.e., "overdues." An extremely efficient method for cancelling returns utilizes pre-printed columns of numbers on large search sheets. It is noted that these sheets are usually large enough to list as many numbers as there are frames on one reel of microfilm, or as may roughly equal the anticipated number of transactions involving one due date.

The columns are arranged in hundreds for easy searching. When a book is returned, the librarian merely goes to that transaction number on the pre-printed sheet and crosses it out with an ordinary pencil. On the due date, the uncancelled numbers representing the overdues are noted and searched manually and visually on microfilm viewers of various types and manufacture, and either typed out or, where viewer-printers are used, printed out onto pre-printed overdue notices and mailed. In a recent nationwide study of library circulation systems, it was determined that this system was difficult to improve upon from the standpoints of economy and speed.

By using this invention, the uncancelled numbers would be scanned and the overdue automatically positioned for viewing or printing, thus eliminating a tedious and time consuming task of the librarian.

Other objects and advantages of this invention will be readily apparent to those skilled in the art upon reading the appended claims and the following detailed description of exemplary embodiments of the invention, in conjunction with the drawings, in which:

Figure 1:
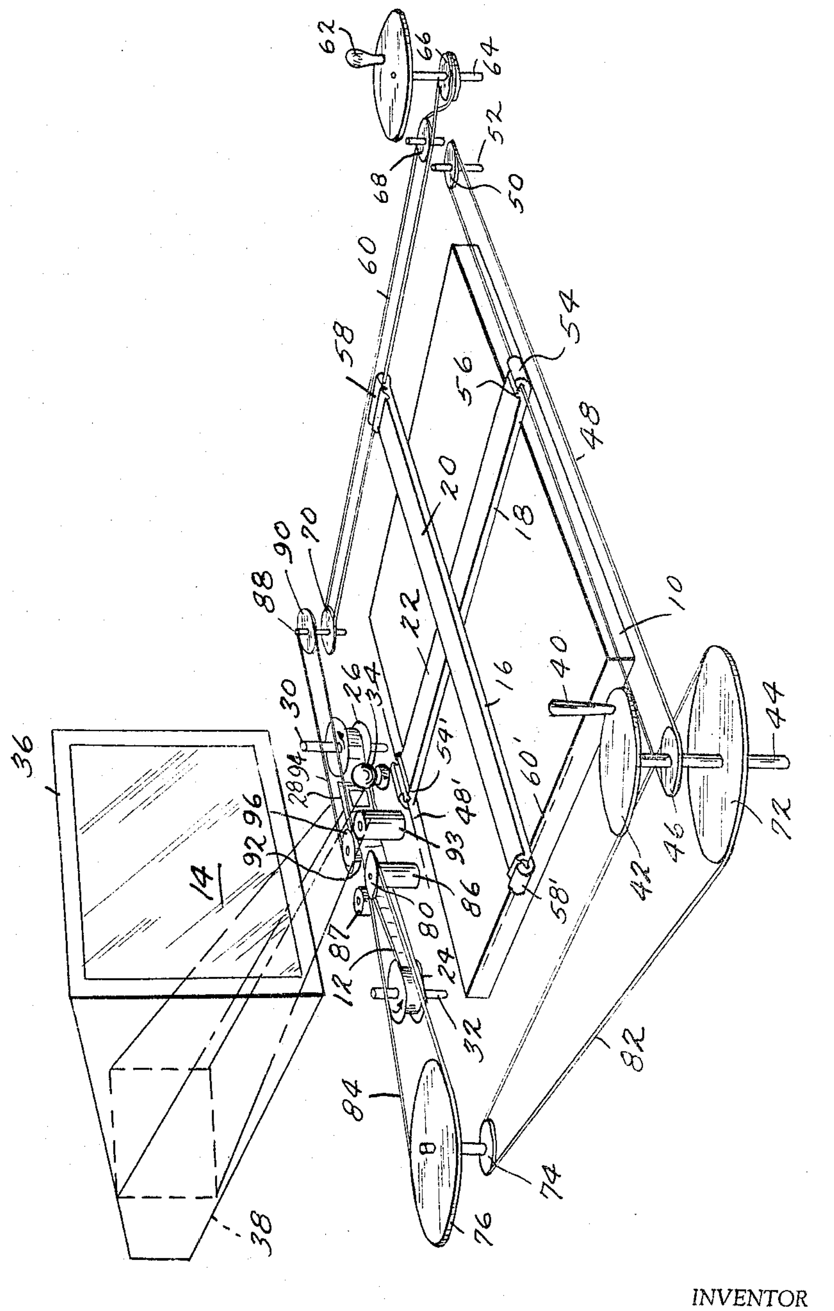
FIGURE 1 is a system diagram of the invention showing the principal mechanical elements in perspective form.

The equipment in FIGURE 1 provides for the ability to locate any desired coordinate position on a search table 10, and to determine which portion or frame of microfilm 12 corresponds thereto. In addition, the contents of that selected frame may be readout via an optical arrangement including screen 14 and may be printed out on one of many commercially available microfilm reader-printers.

Figure 2:
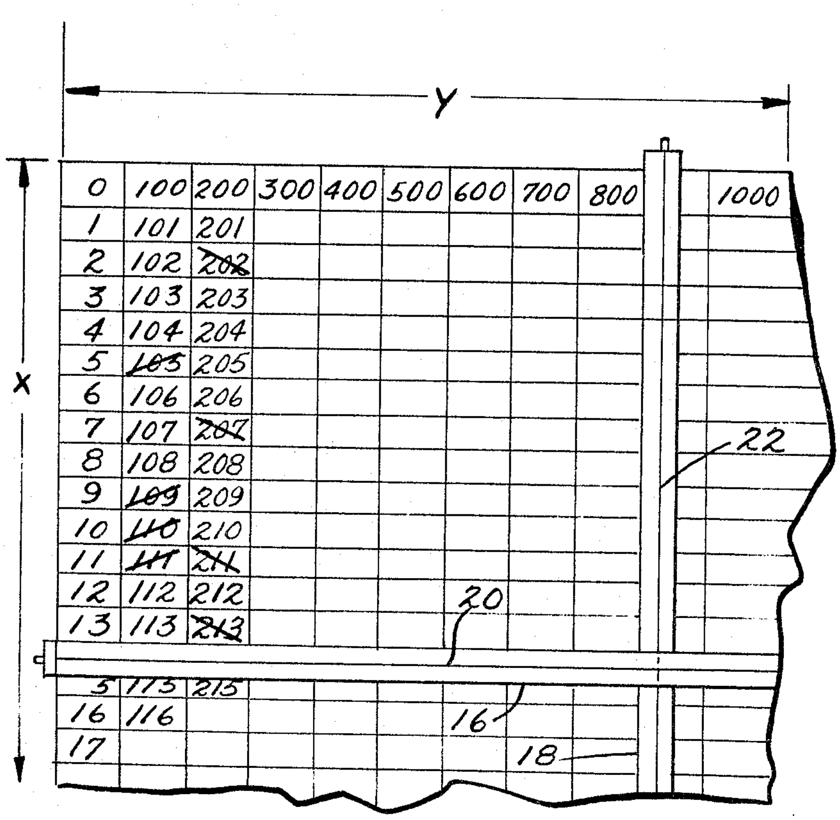
FIGURE 2 shows a partial chart usable with the invention.

Initially, it is to be understood, in accordance with the present embodiment being described, that the strip of recording material, such as the microfilm 12, has prerecorded onto it, in successive frames, the various bits of information desired. In keeping with the example above set forth concerning library recording and retrieval techniques, each frame of the microfilm contains information concerning different books that are due on a particular date, including such information as the borrower's name and address. In addition, these frames, are in effect, successively numbered from 0 to 10,000 for example. These numbered frames are correlated with the coordinate positions of a chart or the like, such as shown in FIGURE 2. In the rightward or Y direction, the columns are headed by hundreds, and in the downward or X direction the rows are headed by unit figures from 0 to 100. Therefore, it will be appreciated that the coordinate chart and film frames correlate number by number as long as the chart is followed in numerical sequence. In FIGURE 2 there are two crossed, reference markers 16 and 18, each of which is transparent and contains a respective hairline 20, 22. These transparent hairline supports or markers 16 and 18 are each movable perpendicular to themselves, whereby the intersection of the two hairlines may be positioned over any one of the 10,000 uniquely numbered locations on the chart.

As above explained, after the due date for books that have been borrowed, a chart of the nature shown in FIGURE 2, which has the numbered areas, corresponding to the timely returned books, cancelled as by a diagonal mark therethrough as shown may therefore be consulted to arrive at the numbers which reflect overdue books. Since the strip of microfilm 12 in FIGURE 1 has its frames numbered from zero up, it becomes necessary, therefore, to correlate the position of the film with the position of the intersection of the crossed hairlines. This is accomplished by the equipment shown in FIGURE 1.

Microfilm 12 is movable in either direction between supply reel 24 and take-up reel 26. In other words, when its first or zero numbered frame is positioned at the framing window 28, most of the microfilm will be on supply reel 24 while the take-up reel 26 will be engaged with the film. While not shown, preferably the shaft 30 of take-up reel 26 is coupled to any desired type of apparatus which will continuously tend to cause reel 26 to take up the microfilm, but the film will not be caused to advance thereby until the advancing or film moving equipment described below is signalled. As the film drive mechanism is independent of the reels, this system can also be applied to those microfilm reader-printers which do not utilize take-up reels but which allow the film which has advanced through the viewing area to festoon freely into a chamber. In a similar vein, shaft 32 of supply reel 24 may be associated with any desired sort of braking equipment.

When a particular frame of film is positioned to window 28, light from a given source such as bulb 34 transilluminates the film into the projection equipment 36, for example onto reflector 38 which reflects the filmed image (reversed as necessary) onto the rear of screen 14, from the front of which the image becomes available for purposes of ready reading and/or printing. As previously indicated, the information available on the screen quickly gives the operator the name and address of the person who borrowed the book in question, but has not returned it by its due date. The projection equipment including the arrangement of the supply and take-up reels may be effected in any conventional manner, for example as in the well known Recordak Lodestar Reader-Printer (Model PES) produced by Recordak Corporation, which is a subsidiary of the Eastman Kodak Company.

Any desired procedure may be utilized for seeking the numbers on the chart of FIGURE 2, which have not been cancelled, as have been the numbers shown to be stricken by a diagonal line. For example, the crossed hairline markers 16 and 18 may each be manually moved so that their intersection superposes an uncancelled number, but preferably they are moved semiautomatically, or automatically if desired. In FIGURE 1, movement of the column or Y marker 18 may be accomplished by rotation of a crank arm or handle 40. As illustrated, this handle is disposed on a disc 42 which is secured to a shaft 44. This shaft in turn carries a pulley 46 for moving a drive cord or cable 48, which also operates with a pulley 50 that is rotatably secured in position by shaft 52. Cable 48 is frictionally or otherwise secured to a holder 54 on one end of marker 18. As illustrated, this holder has a slit 56 through which the cable is inserted to the innermost gripping portions of the holder. Similarly, on the opposite end of marker 18 is another holder 54' which grips a cable or cord 48'. This latter cable is preferably coupled by means not shown to shaft 44 so that both ends of marker 18 will move in either direction, in unison. Other arrangements for moving the marker may be utilized as desired.

It is therefore apparent, that when handle 40 is rotated clockwise, marker 18 progresses rightwardly, i.e., up the Y scale. Handle 40 may also be rotated in the opposite direction to move marker 18 leftwardly. The arrangement therefore gives the facility of stepping the Y column marker and its hairline 22 from one column to the next in either direction, as desired.

A similar sort of arrangement is provided for movement of the X or row marker 16. As illustrated on the right end of marker 16, a holder 58 is provided for a cable or cord 60. Therefore, when handle 62 is rotated about shaft 64 in a clockwise direction, pulley 66 will also move clockwise, while pulleys 68 and 70 will move counter clockwise causing the X hairline 20 to move in a downward direction, i.e., from the number zero towards 100 on the chart in FIGURE 2. Rotation of handle 62 in the opposite direction will move the marker in the opposite direction. Marker 16 has a holder 58' at its opposite end, for a cable or cord 60', which is preferably connected to move with rotation of handle 62 to aid the desired movement of marker 16.

As above indicated, movement of handle 40 in a clockwise direction causes marker 18 to progress rightwardly. At the same time by virtue of pulleys 72, 74, 76 and 80 in conjunction with respective driving cords or cables 82 and 84, such clockwise movement of handle 40 causes film mover 86 to operate on film 12 against backing roller 87. Film mover 86 may be of any desired conventional form, such as a sprocket wheel, a linear measurement device, or a frame counter, so as to advance the film rather rapidly, i.e., 100 frames or spaces per movement of marker 18 one column. This operates as a coarse control for selecting the particular frame which the column marker 18 superposes.

On the other hand, after the reel of film has been moved to the correct column number, handle 62 is rotated to move marker 16 so that the cross hairs 20 and 22 intersect over an uncancelled number in that column. This in turn causes cable 60 to rotate not only pulley 70 but shaft 88 and pulley 90. By virtue of a drive cord or cable 94 and a pulley 96, this turns a second film mover 92 and its backing roller 93, thereby advancing film 12 by a relatively "fine" control to the desired frame within the particular hundred frames encompassed by the column in question.

With this selection of the specified frame, the contents thereof is projected onto screen 14 for ready reading, and/or printing as previously indicated.

Following selection of one uncancelled number, the next uncancelled number on the chart may be selected, in the same manner, without returning the cross hairs to 0—0. Instead, the markers may be moved forwardly or in reverse direction, preferably the Y marker first, in order to arrive at whatever the next uncancelled number is. This procedure may be repeated as often as necessary, whereby all of the uncancelled numbers are selected to give the desired information for each, on the screen. When multiple page documents are used, each page or frame is given an ascending adjacent position-address on the coordinate search sheet or cards on which it is indexed.

While FIGURE 1 has been explained with regard to the chart type of overlying sheet as shown in FIGURE 2, it is also contemplated that such a marked chart itself would not be employed. Instead, unmarked graph paper for example could be used while markers 16 and 18 are themselves made to have scales. For example the X marker 16 would have the column heading numbers while the Y marker 18 would have the X or row headings marked in scale form. In this manner, items may be cancelled by filling in a scaled area of the paper with pencil or some such marking device, and therefore the remaining uncancelled areas, when scaled, will represent the overdue transaction numbers. These uncanceled areas may be searched, i.e., scaled, after the due date, in ascending order of their positions, so as to obtain the filmed information in projected form in the same manner as previously described. The advantages of this system over the one previously described are the compactness resulting in large numbers of transactions per due date and the savings from using unmarked graph paper rather than preprinted sheets of the FIGURE 2 type.

Another use to which the present equipment can be put advantageously is in providing an inexpensive means for searching and printing maps or aerial photographs of small areas from maps or photographs of larger areas.

In this case a map of a given area, say Germany, has a scale of 1:1,000,000. This map is indexed by a grid system which refers to 1,000 smaller scale maps showing smaller areas in greater detail. Microfilm copies of these smaller maps are placed in numerical order, corresponding to the grids on the larger map, onto one reel of microfilm.

If the searcher is generally acquainted with the area, he can immediately position the cross-hairs roughly in the center of the grid on the map of the larger area and simultaneously position the detailed map of that grid sector for viewing and/or printing.

If the searcher has access to a gazetteer and has obtained the North-South and East-West coordinates of a given spot on the large map, he would utilize a special scale showing the degrees and minutes of longitude and latitude on the larger map. Accordingly, the alignment of cross-hairs over this position will simultaneously display the correct detail map of the area. Furthermore, various types of maps for the same area can be microfilmed on separate reels and indexed in the same area for retrieval. Thus the searcher can position a given frame for detailed viewing of the small areas on identically indexed reels, each of which would contain one type of map (e.g. for vegetation, geology, topography, highways, hydrographic, classified or unclassified, infra-red, radar, etc.).

Another version would involve the simultaneous lookup of several reels of the desired types using only one search table so that as soon as the cross-hairs are lined up on the search sheet map, viewers would show (and/or print) six or eight separate types of maps of the same detailed area or sector. For stereo-viewing, two reels could be positioned simultaneously, using appropriate stereo projection equipment.

Another use to which the present equipment can be put with facility is determining which one or ones of a plurality of different individuals or items, has or have one or more of various characteristics which have been previously catalogued by correlation between the coordinate positions of the table and the numerical positions on the film and of retrieving and viewing (and/or printing) the detailed data pertaining to that individual or item which may be contained on the film frame. As a more specific example, which will elucidate the situation more readily, consider use of the equipment in a personnel department of a corporation, wherein prospective employees have been rated or graded as to variety of characteristics. For example, consider a group of engineers and scientific personnel. The characteristics of these people would be noted; for example, age, education, experience, etc. Each person and his characteristics (e.g. employment application), are recorded on different frames of the microfilm, and therefore each person is assigned a particular coordinate location on the search table.

Figure 3:
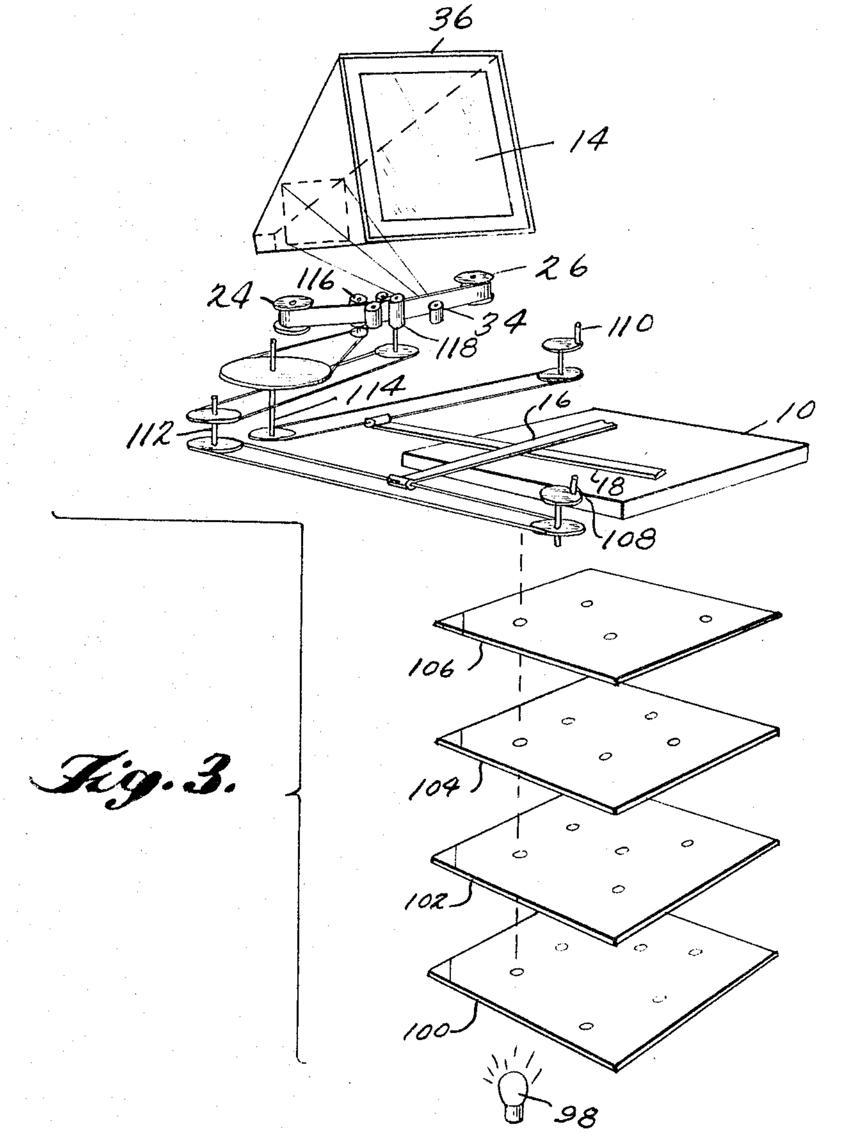
FIGURE 3 illustrates another form of the invention, utilizing same for selection by characteristics.

An arrangement is shown in FIGURE 3 to accomplish the selection of individuals who have a certain group of characteristics. Of course, this same arrangement may be applied to the selection of various items, such as in an inventory situation for example. The projection equipment 36, including light source 34 and the supply and take-up reels 24, 26, may be arranged similarly as that shown in FIGURE 1. Likewise, table 10 has X marker 16 and a Y marker 18 as previously described, while the pulley and drive arrangement shown in FIGURE 3 is slightly different, but equivalent. In this embodiment, a light source 98 in conjunction with one or more cards 100, 102, 104, and 106 may be employed. Each card is related to a particular characteristic, for example card 100 may be related to age, and there is a hole punched in each of its coordinate positions which correspond to the same coordinate positions of table 10 that are assigned to prospective employees of a certain age. A different card is used for each different age. Card 102, on the other hand, may be related to a certain degree of education, for example to a BSEE degree, and the coordinate position thereof associated with the number of each person having that degree would be apertured, i.e., punched out. As with age, different cards would be related to different education levels. In a like manner, card 104 could be similarly related to experience, while card 106 is similarly related to marital status, for example.

Therefore, when each card has a hole at the same coordinate position so that there is vertical alignment of the holes in all of the cards, light will travel all the way through the stack of cards and onto table 10. While FIGURE 3 for convenience shows the cards on the underside of table 10 and depicts an exploded view to the extent that the cards are separated from each other and from table 10, it is to be appreciated that the cards would be contiguous with each other and the table, preferably on top side thereof, with markers 16 and 18 superposing the cards themselves and the light being under the table.

In any event, according to the alignment of holes in the various cards, one or more pinpoints of light will exit the top of the arrangement, and handles 108 and 110 may be rotated appropriately to cause movement of markers 16 and 18 to successive positions of intersection over the pinpoints of light. By such positioning with those handles, or by direct manual position of the markers themselves, if desired, shafts 112 and 114 are rotated, and these in turn rotate a coarse film mover 116 and the fine film 118 mover in a manner similar to that previously discussed relative to FIGURES 1 and 2. Of course, each different pinpoint of light which is found and selected by rotation of handles 108 and 110, causes a different set of information to be projected onto the screen 14 for viewing and/or printing, which gives the qualifications in more detail of the person who has the characteristics sought.

Cards 100–106 in FIGURE 3 are the type which above have been referred to as "peek-a-boo" cards, as is conventional in the art. These cards are also known as "Termatrex" cards, manufactured by the Yonker Business Machine Company, Gaithersburg, Maryland. Others are known as "Key dex" cards, as manufactured by the Royal McBee Corporation. They are also known as "Batten" cards. Preferably, they are visibly marked for proper orientation, such as by having one corner cut off as illustrated. Additionally, the cards are marked as to their upper side, in order to make sure the proper side is positioned upwardly.

Figures 4, 5:
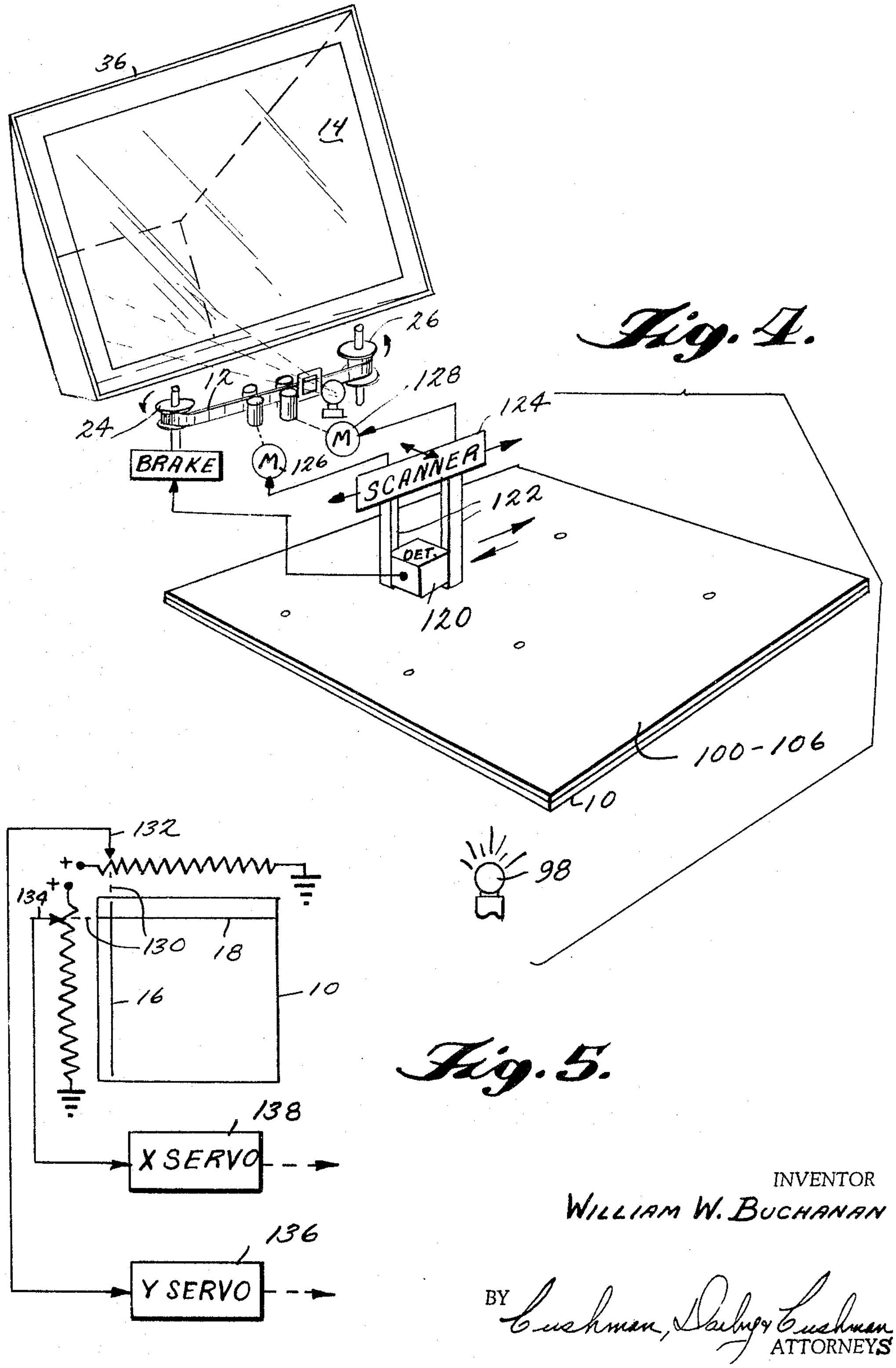
FIGURE 4 illustrates a further embodiment of the invention using a photodetector sensing and scanning system.
FIGURE 5 schematically illustrates an exemplary form of positioning equipment.

FIGURE 4 illustrates another embodiment of this invention, particularly an embodiment related to that just described with regard to FIGURE 3. In FIGURE 4, table 10 supports the aforementioned plurality of cards 100–106. The various coordinated apertures allow light to be transmitted upwardly as in FIGURE 3, but in FIGURE 4 this light is sensed by a photoelectric detector means 120. Detector 120 is physically connected by braces 122 or the like to a scanner 124, which moves the detector from the zero coordinate position sequentially upwards, as by sensing one column completely and then the next. Any other desired way of effectively sensing the locations of the various pinpoints of light may be employed as desired.

While scanner 124 is moving the detectors, it also provides, in conventional manner, signals to the respective coarse and fine servo motors 126 and 128 for moving film 12 in correspondence with detector 120. In other words, when detector 120 is at a given coordinate location, film 12 is also, at that time, at that same numbered position. This photoelectric manner of sensing the coincident apertures in cards 100–106, i.e., sensing the light therefrom, provides for a rapid automatic manner of obtaining on screen 14 the information desired.

A still further feature of this invention is illustrated in FIGURE 5. This feature may be considered, in a sense, a detail of the scanner-servo arrangement of FIGURE 4, or alternatively, it may be considered a detailed manner in which the positions of the crossed markers 16 and 18 of FIGURES 1 and 3 may be transmitted to the film moving equipment. In more detail, the crossed markers 16 shown in FIGURE 5 are mechanically connected, as shown by dash lines 130, to respective potentiometer arms 132 and 134. Accordingly, variations in position of either marker 16 or 18 will cause a different bias to be applied to the respective servo mechanism 136, 138. In turn, these servo-mechanisms drive the respective coarse and fine film advancers, for example, film movers 86 and 92 of FIGURE 1.

Various other ways of positioning, and sensing the position of markers 16 and 18 may be employed, for example mechanical, electrical, or hydraulic systems, as well as mixtures of these various means, and it should be appreciated that the invention is not limited to any specific manner.

From the foregoing, it can be appreciated that this invention provides for all of the objects and advantages herein mentioned. Other objects and advantages, and even further modifications of the invention, will become apparent to those of ordinary skill in the art upon reading this disclosure. However, it is to be understood that this disclosure is considered exemplary and not limitative, the scope of the invention being defined by the appended claims.

What is claimed is:

1. Apparatus for positioning a strip of recording material having a lengthwise dimension to any desired frame located along the said dimension thereof in accordance with a unique position on a search sheet comprising:

means for sensing said unique position on said search sheet, means for moving X and Y coordinate scales to the said unique position on the search sheet, means for moving said strip along the said lengthwise dimension, and means for controlling said strip moving means in accordance with said position on the search sheet, said controlling means being responsive to said X and Y scales to successively provide coarse and fine determinations of the location of the frame on said strip corresponding to said position on the search sheet.

2. Apparatus for positioning a strip of recording material to any desired portion thereof in accordance with the position of a location on a coordinate plane, where each position has at least two coordinates and said strip of recording material has a plurality of frames of information prerecorded along the lengthwise dimension thereof, each of said frames being correlated to one of said positions comprising:

means for establishing a first coordinate of a position in the plane, means for establishing a second coordinate of said position, means for moving said strip of recording material along said lengthwise dimension, means for controlling said strip moving means, responsive to said means for establishing said first coordinate, or providing a coarse determination of the location of the frame, corresponding to said position, on said strip of recorded material, and said controlling means also being responsive to said means for establishing said second coordinate, for providing a fine determination of the location of said frame, corresponding to said position, on said strip of recorded material thereby locating the frame associated with said position.

3. Apparatus as in claim 2 where:

said strip moving means includes first and second means for moving the strip, and said controlling means includes first and second control means respectively associated with said first and second means for moving the strip.

4. Apparatus as in claim 2 including means forming said coordinate plane and having apertures at unique coordinate locations.

5. Apparatus as in claim 2 wherein the said controlling means includes an electrical servo system.

6. Apparatus as in claim 2 wherein said first and second coordinate establishing means respectively include column and row markers disposed in cross relationship and movable to intersect at any desired position on said coordinate plane.

7. Apparatus as in claim 6 wherein said controlling means includes said coarse control means operative from one of said markers and fine control means operative from the other marker for regulating movement of said strip by said strip moving means as aforesaid.

8. Apparatus as in claim 7 where:

said coarse control means includes first servo means which drives said strip moving means, said fine control means includes second servo means which drives said strip driving means, first and second potentiometer means respectively, mechanically connected to said column and row markers, said first and second potentiometer means being respectively connected to said first and second servo means to apply bias voltages thereto, thereby driving the respective coarse and fine control means.

9. Apparatus as in claim 2 wherein said locating means includes photodetector means scannable over said plane.

10. Apparatus as in claim 9 wherein said controlling means includes means for causing said strip to move in certain units during the scan of said photodetector means in one direction and in subdivisions of said units during the scan thereof in a second direction.

11. Apparatus as in claim 2 wherein said controlling means includes means for uniquely indicating electrically the located position and means responsive to said electrical indication for positioning said film in accordance therewith.

12. Apparatus as in claim 2 wherein said first and second coordinate establishing means include means for causing the location of a position on said coordinate plane to be in accordance with at least one predetermined characteristic which is recorded in the corresponding frame.

13. Apparatus as in claim 12 wherein said location causing means includes a plurality of cards related to different ones of said predetermined characteristics and having indicia at coordinate positions corresponding to the frames in which the respective characteristics are recorded on said strip.

References Cited by the Examiner

UNITED STATES PATENTS

| | | | |
|---|---|---|---|
| 2,922,893 | 1/1960 | Ett. | |
| 3,117,491 | 1/1964 | Stern | 88—24 |

NORTON ANSHER, *Primary Examiner.*

RICHARD A. WINTERCORN, *Assistant Examiner.*